June 5, 1934.  E. PRICE  1,961,780

BRAKE MECHANISM

Filed Dec. 26, 1931

Inventor:
Edgar Price,
by Chas. E. Mullan
His Attorney.

Patented June 5, 1934

UNITED STATES PATENT OFFICE 1,961,780

BRAKE MECHANISM

Edgar Price, Schenectady, N. Y., assignor to General Electric Company, a corporation of New York Application December 26, 1931, Serial No. 583,204

12 Claims. (Cl. 188—171)

My invention relates to brakes, more particularly to electrically operated brakes.

An object of my invention is to provide a brake mechanism in which the friction members will have opposite and equal movements.

Another object of my invention is to provide means for moving the friction members away from the brake drum when said members are moved to the released position.

A still further object of my invention is to provide a strong and compact brake mechanism providing ease of accessibility for adjustment purposes and disassembly.

My brake-operating mechanism comprises a pair of friction members pivotally connected at one end and slidably supported in blocks biased away from the brake drum. The other ends of said friction members are pivotally connected to a link mechanism comprising a pair of levers biased to move the friction members to braking position. The levers are operably connected and employ a sliding connection such that substantially equal and opposite movements of the friction members will be assured. The biasing spring is below and adjacent the levers which are connected to an electroresponsive releasing mechanism which can be adjusted for the air gap between the armature and the electroresponsive coil as the friction members wear. The arrangement of the levers, biasing spring, and electroresponsive releasing mechanism provides a compact arrangement requiring practically no head space for this mechanism. The frame is made of strong light bar material in which the supporting members are welded thereto.

Figure 1:
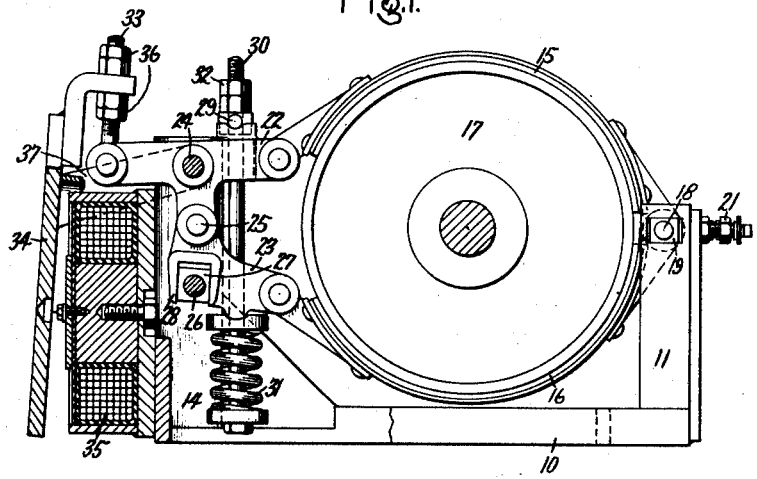
Figure 2:
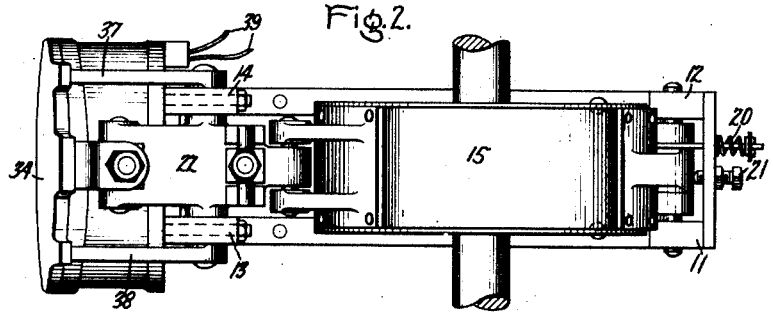
Figure 3:
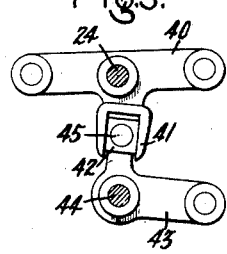

Fig. 1 shows a side view of my brake mechanism with portions thereof cut away to show the lever mechanism, biasing spring and electro-responsive releasing mechanism; Fig. 2 is a top view of my brake-operating mechanism; and Fig. 3 shows a modification of the link mechanism for insuring equal and opposite movements of the friction members.

In Fig. 1 a base 10 has mounted at one end thereof the supporting members 11 and 12. The base member is provided at the other end with supporting members 13 and 14. A pair of brake friction members 15 and 16 for brake pulley 17 are pivotally connected by means of the pin 18 and slidably mounted in blocks such as 19 for permitting radial movement of the pivoted end of said friction members. A biasing spring 20 urges the pin 18 radially and outwardly when the friction members 15 and 16 are moved to the released position. An adjustable set screw 21 is provided for varying this radial movement.

A lever 22 pivotally mounted in the supporting elements 13 and 14 upon the pin 24 is pivotally connected to the upper friction member 15. A second lever 23, pivotally connected to the first lever by means of the pin 25, is also pivotally connected to the lower friction member 16. The pin 26 mounted in members 13 and 14 rotatably supports a block member 27 which slidably cooperates with the U-shaped yoke 28 on the lever 23. When the lever 22 is rotated in either direction about its pivot 24, motion is transmitted to the floating lever 23 through the pin 25. The sliding connection of lever 23 with the block 27 causes the ends of the levers 22 and 23 connected to the friction members 15 and 16 to have movement which is opposite and substantially equal.

It will be seen that rotation of the lever 22 in a counter-clockwise direction causes the pin 25 to move in toward the pulley 17. This also moves the arm of the link 23 connected thereto in toward the pulley 17. The pin 26 and block 27 act as a pivot for the lever 23 and cause a movement of the link 23 in a clockwise direction about the pin 26 when the lever 22 is rotated in a counter-clockwise direction. Upon clockwise movement of link 22 the link 23 moves in a counter-clockwise direction. Thus links 22 and 23 are made to move in opposite directions. The lever arms between the pins about which they pivot and the pins connected to the friction members are equal and hence cause substantially equal movement of the friction members away from the pulley 17.

A bolt 30 carries a pin member 29 which cooperates with the upper lever 22 and its lower end a spring 31 cooperates with the lower floating lever 23. This spring is under compression and tends to move the ends of the levers connected to the friction members toward each other to move the friction members to braking position. The compression in the spring 31 can be varied by means of the nuts 32.

The brake releasing mechanism comprises an electro-responsive coil 35 having an armature 34 pivoting on the pin 24 by means of the arms 37 and 38. This armature is pivotally connected to the lever 22 by means of the bolt 33 and nuts 36. When the electroresponsive coil 35 is energized it rotates the armature 34 in a counter-clockwise direction about the pivot pin 24 moving the lever 22 in a counter-clockwise direction. This causes the end of lever 22 connected to the friction member 15 to move upwardly and through its connection with the floating lever 23 causes the end of lever 23 connected with friction member 16 to move downwardly, thus moving the friction members away from the brake drum 17. This movement releases the friction members so that the biasing member 20 can move the pivoted end of the friction members radially away from the drum, thus insuring that the friction members have a substantially equal clearance around the periphery of the brake drum.

In order to vary the air gap between the armature 34 and the coil 35, the nuts 36 may be adjusted upon the bolt 33 for this purpose.

In Fig. 3 the lever 40 is a modification of the lever 22 and is pivotally mounted on the pin 24. Instead of carrying the pin 25 which connects lever 23 and 22, yoke 41 is provided. The lever 43 which corresponds to the lever 23 carries a block 42 pivotally mounted at 45, thus providing a sliding connection between the two levers 40 and 43. The pins 24 and 44 are stationary. The operation of this construction is the same as that shown in Figs. 1 and 2.

It will be seen that by means of my lever construction, substantially equal and opposite movements of the friction members are assured so that proper braking will take place around the entire circumference of the brake pulley. Due to the placement and construction of the lever biasing spring and electroresponsive releasing mechanism, a very compact unit is obtained which requires practically no greater head space than is necessary for the brake drum and friction members. The biasing member provided in the pivoted end of the friction members insures even release of the friction members from the brake drum.

While I have described my invention in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the appended claims.

What I claim as new and desire to secure by Letters Patent of the United States is:

1. A brake having a pair of friction members mounted for movement in opposite directions between a braking position and a released position, spaced-apart pivot pins, a lever mounted on one of said pins and connected to one of said friction members, and a second lever mounted on another of said pins and connected to the other friction member, said levers cooperating to simultaneously move said friction members in opposite directions, means including a sliding block and yoke connection for causing said second lever to have substantially equal and opposite movements of said first lever, and an operating device connected to said levers for moving said levers and friction members to released position, said operating device including a vertically mounted armature pivotally supported on one of said pins, and an electromagnet for operating said armature and mounted between said armature and said levers and adjacent said levers.

2. A brake having a pair of friction members mounted for operation in opposite directions between a braking position and a released position, means for biasing said members to a braking position, a lever pivotally mounted and connected at one end to one of said friction members and having attached to its other end an operating device for moving said friction members to the released position, and a second lever connected to the other friction member and to said first lever, said second lever having a yoke portion provided with oppositely disposed flat faces on the inside thereof, and means including a stationary member provided with a movable block having surfaces slidably engaging with the faces of said yoke whereby movement of said first lever will cause a substantially equal and opposite movement of said second lever when said first lever moves in response to said operating device or to said biasing means.

3. A brake having a base, an upper friction member and a lower friction member mounted on said base for operation in opposite directions between a braking position and a released position, a pin supported by said base, a lever pivotally mounted on said pin and connected to said upper friction member, a second lever pivotally connected to said first lever and to said lower friction member, means including a sliding connection with said second lever for causing simultaneous substantially equal and opposite movements of said levers, a biasing spring contacting with and mounted beneath said second lever for biasing said friction members to braking position, and an electro-responsive device mounted at the side of and adjacent to said levers and biasing spring for moving said friction members to released position, said electro-responsive device comprising an armature connected to said first lever and pivotally mounted on said pin in a vertical position, and an electro-magnet supported on said base between said armature and said levers and biasing spring.

4. A brake for a brake drum having a pair of friction members pivotally mounted at one end for movement in opposite directions between a braking position and a released position, levers connected to said friction members for operating the same, means for causing substantially equal and opposite movement of said levers and friction members to the braking and released positions, and a yielding sliding support for the pivoted ends of said friction members whereby when said members are moved to released position said yielding support will move the pivoted ends of said friction members radially away from the brake drum.

5. A brake for a brake drum having a pair of friction members pivotally mounted at one end for operation in opposite directions between a braking position and a released position, means for biasing said members to braking position, a pair of spaced apart stationary pivot pins, a lever connected to one of said friction members and mounted on one of said pivot pins, a second lever pivotally connected to said first lever and to the other friction member, said second lever having a sliding connection with said other pin, an operating device connected to said first lever to move said levers to released position, said sliding connection causing said second lever to have movement opposite and substantially equal to said first lever whenever said first lever moves in response to said operating device or to said biasing means, and a yielding sliding support for the pivoted end of said friction members whereby when said members are moved to released position said yielding support will move the pivoted end of said friction members radially away from the brake drum.

6. A brake having a base, a pair of friction members mounted on said base for movement in opposite directions between a braking position and a released position, a support extending from said base and having a pivot pin mounted thereon, a lever mounted on said pin and connected to one of said friction members, a second lever connected to the other friction member, said second lever being operatively connected with said first lever to simultaneously move said friction members equally in opposite directions, a biasing spring mounted beneath said second lever and between said second lever and said base and contacting with said second lever for biasing said friction members to braking position, an electro-magnetic operating means connected to said first lever for operating said levers to released position including a vertically disposed armature pivotally mounted on said pin and connected to said lever mechanism, and an electro-magnet supported on said base intermediate said armature and said levers.

7. A brake having a base, a pair of friction members for cooperating with a brake drum and pivotally mounted at one end for movement in opposite directions between a braking position and a released position, a yielding sliding support for the pivoted ends of said friction members mounted on said base and movable radially, a support extending from said base and having a pin mounted thereon, a lever mounted on said pin and connected to one of said friction members, a second lever connected to the other friction member, said second lever being operatively associated with said first lever to simultaneously move said friction members equally in opposite directions, a biasing spring mounted beneath said second lever and between said second lever and said base and contacting with said second lever for biasing said friction members to braking position, said sliding support when said members are moved to released position moving the pivoted ends of said friction members radially away from the brake drum, electro-magnetic operating means connected to said first lever for operating said levers to released position including a vertically disposed armature pivotally mounted on said first pin and connected to said lever mechansim and an electromagnet supported on said base intermediate said armature and said levers.

8. A brake having a pair of friction members mounted for movement in opposite directions between a braking position and a released position, a lever connected at one end to one of said friction members for operating the same, a fixed pivot pin for said lever, a floating lever connected at one end to said other friction member, said floating lever being provided with a yoke having on the inside thereof oppositely disposed flat faces, a pivot pin connecting said levers together, and means including a block operatively associated with said floating lever and having guiding surfaces slidably engaging the flat faces of said yoke for causing said floating lever to have equal and opposite movements of said other lever, and means for operating said levers to move said friction members between braking and released positions, the working pressure between said block and yoke during operation of said levers being distributed over the contacting surfaces of said block and yoke.

9. A brake comprising friction members mounted for movement in opposite directions between a braking position and a released position, means for biasing said members to a braking position, a lever connected at one end to one of said friction members and being pivoted intermediate its ends, a floating lever connected at one end to the other friction member and connected at its opposite end to said other lever, one of said levers being provided with a yoke having on the inside thereof oppositely disposed flat faces, and means including a block operatively associated with said levers, means independent of said levers for supporting said block, said yoke slidably engaging opposite surfaces of said block with said flat faces for causing substantially equal and opposite movements of said levers and friction members to the braking and released positions, the working pressure between said block and yoke during operation of said levers being distributed over the contacting surfaces of said block and yoke, and an operating member connected to said first lever for moving said levers to a released position.

10. A brake comprising friction members mounted for movement in opposite directions between a braking position and a released position, levers biased to the braking position connected to said friction members, one of said levers being provided with a U-shaped portion having on the inside thereof oppositely disposed parallel flat faces, and means including a block operatively associated with said levers and having opposite surfaces thereof slidably engaged by said opposite faces of said yoke for insuring substantially equal and opposite movements of said friction members, supporting means for said block permitting rotation of said block independently thereof, and an operating member connected to said levers for moving said levers and friction members to the released position, the rotation of said block insuring an even distribution of the pressure between said block and yoke during operation of said levers.

11. A brake comprising a brake drum, friction members pivotally mounted at one end for movement in opposite directions between a braking position and a released position, levers biased to the braking position connected to said friction members, one of said levers being provided with a U-shaped yoke having on the inside thereof oppositely disposed parallel flat faces and the other of said levers being provided with a block cooperating therewith, said block having surfaces contacting with both faces of said yoke for providing a sliding engagement with both of said faces whereby substantially equal and opposite movements of said friction members result, a yielding sliding support for the operated ends of said friction members whereby when said members are moved to released position said yielding support will move said pivoted ends of said friction members radially away from said brake drum, and an operating member connected to said levers for moving said levers and friction members to the released position.

12. A brake for a brake drum having friction members pivotally mounted at one end for movement in opposite directions between a braking position and a released position, the opposite ends of said friction members being spaced apart one from the other, levers connected to said friction members for operating the same, means for causing substantially equal and opposite movement of said levers and friction members to the braking and released positions, and a yielding sliding support for the pivoted ends of said friction members for permitting radial movement of said pivoted ends in a line extending from the sliding support intermediate the opposite ends of said brake drum whereby said friction members are spaced an equal amount from said drum irrespective of the wear of said friction members.

EDGAR PRICE.